Nov. 20, 1951     T. E. GRIMAC     2,575,415
DUCTED SPINNER INLET
Filed Oct. 15, 1948
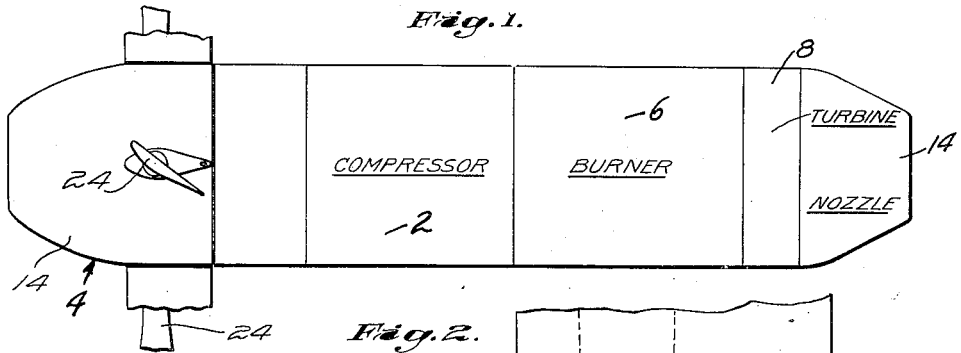
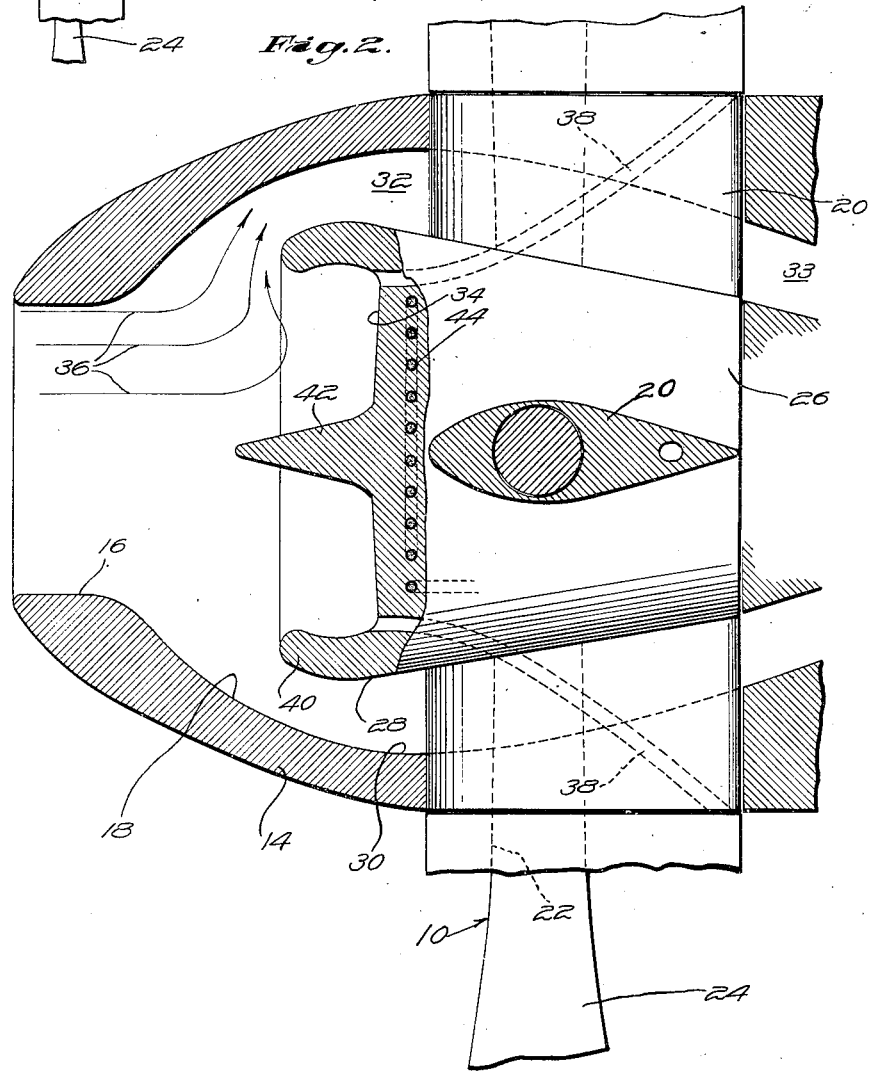
Inventor
Theodore E. Grimac
by Charles A. Warren
Attorney Patented Nov. 20, 1951

2,575,415

UNITED STATES PATENT OFFICE 2,575,415

DUCTED SPINNER INLET

Theodore E. Grimac, Hartford, Conn., assignor to United Aircraft Corporation, East Hartford, Conn., a corporation of Delaware Application October 15, 1948, Serial No. 54,735

4 Claims. (Cl. 170—135.743)

This invention relates to a ducted inlet for use particularly with aircraft power plants and adapted to remove any water or ice particles or other foreign matter from the air passing through the inlet.

Foreign matter, such as dust or other small particles in the air, are detrimental to the operation of power plants, particularly gas turbine types, since the particles may scratch or mar the surface over which the air flows or may collect on the surface and in the air passage thereby impeding efficient flow of air to the power plant. Larger particles may similarly accumulate on the surface of the air passage and also cause damage to the operative parts of the power plant. Furthermore, the large amount of air required for a gas turbine power plant necessitates an arrangement to remove foreign material from a very large mass of air, with the structure by which impurities are removed offering as little resistance as possible to the flow of air, thereby maintaining an efficient operation of the power plant. A feature of the invention is an arrangement for removing the particles of foreign matter from an air inlet with a small pressure drop through the device. Another feature is an arrangement for disposing of the foreign material as it is collected by the separating structure.

In addition to removing solid particles, it is advantageous to remove water which may be in the form of rain or ice from the air entering the compressor of the power plant. A feature of the invention is an arrangement for removing water or ice from the air as it enters the power plant without affecting the flow of air so that it may reach the annular inlet of the compressor with no serious pressure losses. Under severe conditions the mechanism that collects the impurities may fill in a short time. Another feature of the invention is an arrangement for disposing of the collected foreign material by causing it to flow through passages, the discharge ends of which are externally of the air inlet.

Other objects and advantages may be apparent from the specification and claims and from the accompanying drawing which illustrates an embodiment of the invention.

Fig. 1 is an elevation of the power plant incorporating the ducted inlet.

Fig. 2 is a fragmentary, longitudinal view on a larger scale of the inlet.

The invention is shown in connection with an aircraft power plant of the gas turbine type in which an axial flow compressor 2 receives air through the ducted spinner inlet 4. The compressed air is discharged through one or more burners 6 to a turbine 8, the function of which is to drive the compressor and also the propeller system 10. From the turbine the exhaust gas is discharged through a thrust nozzle 12.

The compressor 2 has an annular inlet and it is essential for best operation of the power plant that the flow to all sections of the compressor inlet be the same for any selected operating condition. One arrangement for accomplishing this is by the ducted spinner inlet shown in greater detail in Fig. 2.

As shown, the air inlet includes an outer member 14 or duct having an inlet passage 16, the wall of which is cylindrical, in the arrangement shown. Thereafter, a diverging wall surface 18 on member 14 forms a diverging passage directly communicating with the circular inlet passage 16. The member 14 is mounted on the cuffs 20 that surround the shanks 22 of the propeller blades 24 of the propeller system. The blades are supported by a central element or hub 26, the upstream end of which is located adjacent to the upstream end of the diverging wall portion 18. The outer wall of the hub 28 is approximately parallel to the inner wall 30 of the outer member 14, thereby defining an annular air path 32, the rearward part 33 of which communicates directly with the compressor inlet. The propeller cuffs 20 extend outwardly from the central element 26 and may be constructed to form struts or guide vanes for the air flowing through the passage 32.

The upstream end of the inner element 26 has a recess 34 which receives foreign particles from the air entering the power plant. The recess is slightly larger in diameter than the inlet passage 16 and is in alignment therewith so that all of the air entering the annular passage 32 is caused to change its direction as shown by the arrows 36 with the result that any impurities therein are thrown out by centrifugal force and are received in the recess 34. Foreign particles are collected within the recess 34 and discharged through passage 38 located in the inner member 26, the cuffs 20, and the spinner 14. The curvature of these passages is such that the centrifugal action on the particles of foreign matter assists in the flow of such particles through the passages for their removal. It will also be apparent that the inlet end of these passages is located adjacent to the outer diameter of the recess 34 since it is in these corners of the recess that the impurities will be collected by the centrifugal force as the device rotates.

In addition to providing the hub with the upstanding wall 40 which surrounds the recess and projects upstream from the hub, the recess may have a central cone 42 located centrally of the hub and having the apex of the cone pointed upstream. The purpose of the cone is to cause the air entering the power plant to be directed outwardly, thereby moving the air in a direction to improve the flow of air into the annular inlet.

With this arrangement, there is, in effect, a circular path for the inlet air which extends to the base of the recess 34, with the annular path 32 communicating therewith forwardly of the downstream end of the circular path.

Since many of the impurities that are removed from the air are water or ice, it may be advantageous to provide for heating the central element adjacent to the recess 34 as by a coil 44 to prevent the rapid accumulation of ice therein. Further, if desired, it may be advantageous to provide for heating of the passage 38 through which the impurities are discharged from the recess.

It is to be understood that the invention is not limited to the specific embodiment herein illustrated and described, but may be used in other ways without departure from its spirit as defined by the following claims.

I claim:

1. An air inlet for a power plant, said power plant including a compressor having an annular inlet, said inlet including a propeller hub, an outer member surrounding said hub and forming between said hub and member an annular path for air, said outer member upstream of the hub having a cylindrical air inlet communicating with said annular path and having an area substantially smaller than the propeller hub, the latter having a recess in its upstream end in alignment with and substantially the area of the cylindrical air inlet whereby the air from said cylindrical inlet is turned to centrifugally dispose of impurities therein prior to flowing into said annular path, and propeller blade cuffs on said hub and extending outwardly for supporting said outer member, the annular passage around said hub communicating with the annular compressor inlet.

2. An air inlet for a power plant, said power plant including a compressor having an annular inlet, said inlet including a propeller hub, an outer member surrounding said hub and forming between said hub and member an annular path for air, said outer member upstream of the hub having a cylindrical air inlet communicating with said annular path and having an area substantially smaller than the propeller hub, the latter having a recess in its upstream end in alignment with and substantially the area of the cylindrical air inlet, and propeller blade cuffs on said hub and extending outwardly for supporting said outer member, the annular passage around said hub communicating with the annular compressor inlet and a passage extending through at least one of said cuffs and communicating with said recess for the discharge of foreign matter collecting therein.

3. A ducted spinner for an aircraft propeller comprising a propeller hub located centrally of the spinner and spaced therefrom in predetermined relation therewith, said spinner and hub forming an annular passage, an air inlet in said spinner spaced upstream of said hub and communicating with said annular passage, means carried by said hub for turning the flow of air from said inlet into said annular passage to centrifugally remove foreign matter from the air including a recess on the upstream end of said hub having an area substantially the same as said inlet, said recess having defining edges forming protrusions directed in an upstream direction for retaining the foreign matter, and passage means communicating with said recess and externally of said spinner for discharging the foreign matter accumulating in said recess.

4. In a ducted spinner according to claim 3 wherein means is provided for heating the exposed surface of said recess.

THEODORE E. GRIMAC.

REFERENCES CITED

The following references are of record in the file of this patent:

UNITED STATES PATENTS

| Number | Name | Date |
|---|---|---|
| 1,430,066 | Evans | Sept. 26, 1922 |
| 1,537,690 | Portham | May 12, 1925 |
| 1,774,301 | Terry | Aug. 26, 1930 |
| 1,907,454 | Squires | May 9, 1933 |
| 2,158,863 | Randall | May 16, 1939 |
| 2,396,598 | Neumann et al. | Mar. 12, 1946 |
| 2,397,357 | Kundig | Mar. 26, 1946 |
| 2,435,836 | Johnson | Feb. 10, 1948 |

FOREIGN PATENTS

| Number | Country | Date |
|---|---|---|
| 130,414 | Great Britain | Aug. 7, 1919 |
| 768,647 | France | May 22, 1934 |